April 6, 1926.

F. WILKES

LUBRICATING APPARATUS

Filed Oct. 5, 1925

1,579,586

INVENTOR
Frederic Wilkes
By Kay, Totten & Martin,
Attorneys

Patented Apr. 6, 1926.

1,579,586

UNITED STATES PATENT OFFICE.

FREDERIC WILKES, OF WILKINSBURG, PENNSYLVANIA.

LUBRICATING APPARATUS.

Application filed October 5, 1925. Serial No. 60,430.

*To all whom it may concern:*

Be it known that I, FREDERIC WILKES, a citizen of the United States, and a resident of Wilkinsburg, in the county of Allegheny and State of Pennsylvania, have invented a new and useful Improvement in Lubricating Apparatus; and I do hereby declare the following to be a full, clear, and exact description thereof.

My invention relates to lubricating apparatus and particularly to apparatus that is suitable for lubricating shaft bearings.

One object of my invention is to provide means for maintaining a constant level in oil reservoirs such as are commonly associated with bearings of various types.

Another object of my invention is to provide an improved form of oil feeding device for supplying lubricant to the bearings of machinery.

Still another object of my invention is to simplify and improve generally the structure and operation of lubricating apparatus.

Heretofore it has been necessary to fill the oil reservoirs of bearings when an operator thinks more oil is needed. The oil is usually introduced through an opening under a cap or cover situated at the top of the reservoir and bearing housing. In cases of electric motor bearings, danger arises due to the fact that either an insufficient quantity of oil is supplied, often causing the destruction of the bearing and the rotating parts, or too much oil is supplied and the excess oil leaks to parts of the motor, seriously weakening the dielectric strength of its insulation and causing the motor to be a fire hazard, jeopardizing the safety of the motor and its surroundings. By the use of my invention these various objections are overcome.

Figure 1:
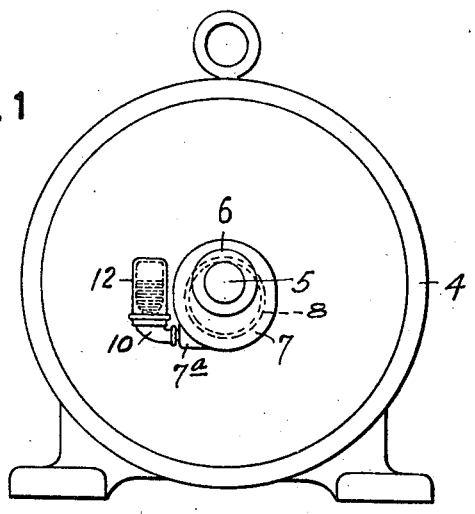
Figure 2:
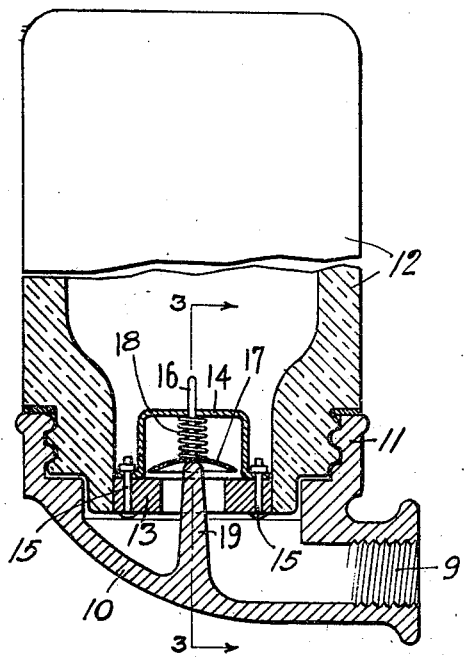
Figure 3:
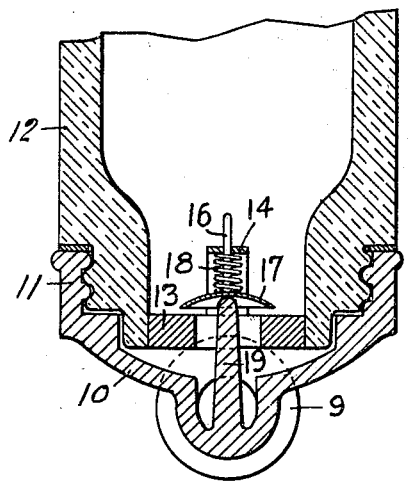

One form which my invention may take is shown in the accompanying drawing, wherein Fig. 1 is an end elevational view of an electric motor equipped with my invention: Fig. 2 is a view, on an enlarged scale, partially in elevation and partially in section, of a portion of the apparatus of Fig. 1, and Fig. 3 is a view taken on the line 3—3 of Fig. 2.

While I have shown my invention as applied to the bearings of an electric motor, it will be apparent that it may be employed in connection with other types of apparatus.

My device is applied to an electric motor 4, which is provided with a shaft 5 that turns in a bearing 6. The bearing 6 is provided with an oil well 7, and rings 8 turn idly on the shaft 5 for the purpose of conveying oil thereto from the well 7. The parts thus far described may be of any well known form.

The well 7 is provided with a lateral inlet 7ª which has a threaded extension or nipple adapted to engage with the threaded portion 9 of a metal fitting 10. The cup or fitting 10 is provided with a threaded flange or collar 11 into which the mouth of a glass jar 12 may be screwed.

The jar 12 is closed by a disc 13 which may be of fibre or any other suitable material, and is provided with an opening centrally thereof. A metal strap 14 is secured to the disc 13 by bolts 15. The strap or bracket 14 is perforated at its midportion so that a valve stem 16 may extend therethrough. The stem 16 carries a valve disc 17 which is normally held against the disc 13 by means of a compression spring 18 interposed between the disc 17 and the strap 14.

When the jar is inverted and turned to the position shown in Fig. 2, the valve 17 is engaged by an upstanding projection 19 that is formed integrally with the fitting 10, so that oil will be permitted to flow from the jar 12 into the reservoir or well 7. Oil will continue to flow until it rises to the top of the inlet passage 7ª. Air can then no longer enter the jar 12 and flow of lubricant therefrom will cease until the oil level of the reservoir 7 falls to such point that air will again be admitted through the connections 7ª and 9, to the jar 12.

It will thus be seen that the supply of oil is automatic and that the contents of the glass jar 12 will be visible, so that the operator may know when to refill the jar.

I claim as my invention:

1. Lubricating apparatus comprising an oil cup having an outlet conduit adapted for communication with an oil reservoir, an open mouthed oil receptacle mounted in inverted position upon the cup, a perforated disc supported in the mouth of said receptacle, a spring-held valve carried by the disc, for closing the perforation, and a projection formed integrally with and extending upwardly from the bottom of the cup, in position to push said valve from its seat when the receptacle is placed upon the cup.

2. Lubricating apparatus comprising an oil cup having an outlet conduit adapted for communication with an oil reservoir, an open mouthed oil receptacle mounted in inverted position upon the cup, a spring-held upwardly opening check valve supported in the mouth of said receptacle, and a projection formed integrally with and extending upwardly from the bottom of the cup, in position to push said valve from its seat when the receptacle is placed upon the cup.

In testimony whereof I, the said FREDERIC WILKES have hereunto set my hand.

FREDERIC WILKES.